US005792650A

United States Patent [19]
Ohtake et al.

[11] Patent Number: 5,792,650
[45] Date of Patent: Aug. 11, 1998

[54] METHOD FOR TREATING WASTE WATER

[75] Inventors: Hisao Ohtake, Hiroshima-ken; Akiko Miya; Hisashi Shinjo, both of Kanagawa-ken, all of Japan

[73] Assignee: Ebara Corporation, Tokyo, Japan

[21] Appl. No.: 556,636

[22] Filed: Nov. 13, 1995

Related U.S. Application Data

[63] Continuation of Ser. No. 205,174, Mar. 3, 1994, abandoned.

[30] Foreign Application Priority Data

Sep. 3, 1993 [JP] Japan .................................. 5-220027

[51] Int. Cl.$^6$ ................. C02F 3/00; C02F 3/34; C02F 11/02
[52] U.S. Cl. .................. 435/262.5; 435/244; 435/264
[58] Field of Search ................... 435/262.5, 264, 435/244

[56] References Cited

U.S. PATENT DOCUMENTS 4,056,465  11/1977  Spector .................................. 210/605
4,431,543  2/1984  Matsuo et al. ......................... 210/605

OTHER PUBLICATIONS

Kato et al., Gene 137: 237–242 (1993).
Crennell et al., Proc. Natl. Acad. Sci. USA 90:9852–9856 1993.
Lugtenberg, in Phosphate Metabolism and Cellular Regulation in Microorganisms, Torriani–Gorini et al. (eds.), Amer. Soc. Microbiol., pp. 1–2, 1987.
Applied and Environmental Microbiology, Nov. 1993, pp. 3744–3749, vol. 59, No. 11, Junichi Kato, et al., "Genetic Improvement of *Escherichia Coli* for Enhanced Biological Removal of Phosphate from Wastewater".
Proceedings for Symposium for Environmental Genetic Engineering held in commemoration of the opening of the new laboratory building at Ohyama Hall of National Institute for Environment Studies (Nov. 12, 1993).
Proceeding for International Symposium on Cellular and Molecular Biology of Phosphate and Phosphorylated Compounds in Microorganisms, Sep. 13–17, 1993, p. 73, "Genetic Engineering of Polyphosphate Accumulation in *Escherichia Coli*".
Pre–print of the Symposium of the Society for Fermentation and Bioengineering, Japan, in Jul. 1993, pp. 28–29, "Molecular Breeding of Polyphosphate Accumulating Bacteria".
Journal of Bacteriology, Dec. 1984, pp. 928–934, vol. 160, No. 3, Corinne Vander Wauven, et al., "Pseudomonas Aeruginosa Mutants Affected in Anaerobic Growth on Arginine: Evidnece for a Four–Gene Cluster Encoding the Arginine Deiminase Pathway".
Proc. Natl. Acad. Sci. USA, vol. 86, pp. 6883–6887, Sep. 1989, Osamu Ohara, et al., "Direct Genomic Sequencing of Bacterial DNA: The Pyruvate Kinase I Gene of *Escherichia Coli*".

Journal of Bacteriology, Jan. 1989, pp. 577–580, vol. 171, No. 1, Asahi Matsuyama, et al., "Cloning, Expression, and Nucleotide Sequence of the *Escherichia Coli* K–12 ackA Gene".
The Journal of Biological Chemistry, vol. 267, No. 31, Nov. 1992, pp. 22556–22561, Masahiro Akiyama, et al., "The Polyphosphate Kinase Gene of *Escherichia Coli*".
Mol. Gen. Genet., 1986., vol. 204, pp. 477–484, Christopher M. Elvin, et al., "Molecular Cloning of the Phosphate (Inorganic) Transport (pit) Gene of *Escherichia Coli* K12".
Journal of Bacteriology, Jan. 1985, pp. 189–198, Brian P. Surin, et al., "Phosphate–Specific Transport System of *Escherichia Coli*: Nucleotide Sequence and Gene–Polypeptide Relationship".
Experiment Manual for Molecular Biology, 1983, Robert F. Schleif, et al., pp. 158–163.
Pre–print of the annual meeting of Japan Society for Bioscience, Biotechnology and Agrochemistry in 1993, Presentation NO. 4Ea8, "Enhancement of Polyphosphate Accumulation Ability by Genetic Engineering".
Pre–print of the annual meeting of The Society for Fermentation and Bioengineering, Japan, in 1992, Presentation No. 453, "Cloning of Polyphosphate Kinase Gene from Klebsiella Aerogenes".
Ebara–Infilco Engineering Review, No. 88, pp. 57–63, 1983, "Anaerobic Oxic Activated Sludge Process—History and Mechanism".
Water SA, vol. 2, No. 1, Jan. 1976, pp. 47–50, A.R. McLaren, et al., "Effective Phosphorus Removal from Sewage by Biological Means".

*Primary Examiner*—Eric Grimes
*Attorney, Agent, or Firm*—Oblon, Spivak, McClelland, Maier & Neustadt, P.C.

[57] ABSTRACT

The present invention relates to a method of treatment of waste water which is characterized by removal of both organic substances and phosphorus from phosphorus-containing organic waste water by novel microorganisms that are fortified in phosphorus-incorporating and/or accumulating abilities. The method for treatment of waste water according to the present invention allows to efficiently remove both organic substances and phosphorus from organic waste water by genetically-engineered microorganisms that have acquired improved abilities in phosphorus incorporation and/or accumulation by genetic transformation using one or more vector plasmids carrying, together with a self-replicative DNA fragment, one of the DNA fragment combinations which include at least one member of the group of (a) a DNA fragment containing a gene involved in phosphate transport through cell membranes; (b) a DNA fragment containing a polyphosphate kinase structure gene; and (c) a DNA fragment containing a structure gene of an enzyme involved in intracellular ATP supply, excluding the sole use of the DNA fragment containing a polyphosphate kinase structure gene.

21 Claims, 5 Drawing Sheets

Fig. 3

```
XhoI
CTCGAGATGCGCGACGGCGCAGCTGGCTGGACGGCGTGAAGTTACCCCCGCAGGTTATGC     60

GGCGGAAGAGTAGTTTGTTACGTCGGGTGGCGCTGCTGCGCTTACCCGACTTGTTCATTG    120

CATTACCCGATATTCCCTTCTCCAACCTTCTAAAATCCCCAACAAAAAAAATAACTGTCA    180

TACTTTCTGGCACTGTTGGACATATCGTGGAAATGCTCGCCATAATAAGGACGAGACGG    240

ATTTACCACGTCCTGTGATTGAACTGGAGTGTGAGCTGTAATGGGTCAGGAAAAGTTATA    300
                                             M  G  Q  E  K  L  Y

TATCGAGAAAGAGCTAAGCTGGTTAGCATTTAACGAACGTGTACTCCAGGAAGCGGCAGA    360
 I  E  K  E  L  S  W  L  A  F  N  E  R  V  L  Q  E  A  A  D

CAAAAGTAACCCGCTGATCGAGCGCATGCGTTTTTTGGGCATTTATTCCAACAACCTGGA    420
 K  S  N  P  L  I  E  R  M  R  F  L  G  I  Y  S  N  N  L  D

TGAGTTCTACAAGGTTCGCTTTGCCGAGCTGAAAAGACGCATCATCATCAGCGAAGAACA    480
 E  F  Y  K  V  R  F  A  E  L  K  R  R  I  I  I  S  E  E  Q

GGGCTTAAACTCGCACTCGCGGCATCTGCTGGGCAAAATCCAGTCCCGCGTACTGAAAGC    540
 G  L  N  S  H  S  R  H  L  L  G  K  I  Q  S  R  V  L  K  A

CGATCAGGAATTTGACGGCCTGTATAACGAACTGCTGCTGGAGATGGCGCGCAATCAAAT    600
 D  Q  E  F  D  G  L  Y  N  E  L  L  L  E  M  A  R  N  Q  I

CTTCCTGATTAACGAACGCCAGCTTTCCGTTAACCAACAAAACTGGCTGCGCCACTACTT    660
 F  L  I  N  E  R  Q  L  S  V  N  Q  Q  N  W  L  R  H  Y  F

CAAACACTATCTGCGCCAGCACATTACCCCGATTCTGATCAACCGCGAAACCGATCTGGT    720
 K  H  Y  L  R  Q  H  I  T  P  I  L  I  N  R  E  T  D  L  V

TCAGTTCCTGAAGGATGATTACACCTACCTGGCGGTGGAAATTATTCGCGGTGAGTCTAT    780
 Q  F  L  K  D  D  Y  T  Y  L  A  V  E  I  I  R  G  E  S  I

CCGTTACCCGCTGCTGGAGATCCCGTCCGACAAGGTGCCGCGCTTTGTGAACCTGCCGCC    840
 R  Y  P  L  L  E  I  P  S  D  K  V  P  R  F  V  N  L  P  P

GGAAACCCCGCGCAGACGCAAGCCGATGATCCTGCTGGATAACATCCTGCGCTACTGTCT    900
 E  T  P  R  R  R  K  P  M  I  L  L  D  N  I  L  R  Y  C  L

GGACGACATCTTCAAAGGCTTCTTCGATTACGATGCGTTAAACGCCTACTCGATGAAAAT    960
 D  D  I  F  K  G  F  F  D  Y  D  A  L  N  A  Y  S  M  K  M

GACCCGTGACGCCGAATATGACCTGGTGCACGAGATGGAAGCCAGCCTGATGGAGCTGAT   1020
 T  R  D  A  E  Y  D  L  V  H  E  M  E  A  S  L  M  E  L  M

GTCCTCCAGCCTGAAACAGCCTGACGCCGAGCCGGTGCGCTTTGTCTATCAGCGCGATAT   1080
 S  S  S  L  K  Q  P  D  A  E  P  V  R  F  V  Y  Q  R  D  M

GCCGGACGCCATGGTGGAGATGCTGCGCGATAAACTGACCATTTCGCGCTATGACTCCAT   1140
 P  D  A  M  V  E  M  L  R  D  K  L  T  I  S  R  Y  D  S  I

CGTGCCGGGCGGTCGTTACCACAACTTTAAAGACTTTATTGGCTTCCCGAACGTCGGCAA   1200
 V  P  G  G  R  Y  H  N  F  K  D  F  I  G  F  P  N  V  G  K

AGCCAATCTGGTGAACAAGCCGCTGCCGCGCCTGCGCCATCTGTGGTTCGATAAATTCCG   1260
 A  N  L  V  N  K  P  L  P  R  L  R  H  L  W  F  D  K  F  R
```

Fig. 4

```
CAACGGATTCGACGCCATTCGCGAACGCGACGTCCTGCTCTACTATCCGTATCACACGTT 1320
 N  G  F  D  A  I  R  E  R  D  V  L  L  Y  Y  P  Y  H  T  F

TGAGCACGTGCTCGAACTGCTGCGTCAGGCCTCGTTCGATCCGAGCGTGCTGGCGATCAA 1380
 E  H  V  L  E  L  L  R  Q  A  S  F  D  P  S  V  L  A  I  K

AATCAACATCTACCGCGTGGCAAAAGATTCCCGCATCATCGACGCAATGATCCACGCGGC 1440
 I  N  I  Y  R  V  A  K  D  S  R  I  I  D  A  M  I  H  A  A

GCACAACGCCAAAAAGGTCACCGTGGTGGTTGAGCTGCAGGCGCGCTTCGACGAAGAGGC 1500
 H  N  A  K  K  V  T  V  V  V  E  L  Q  A  R  F  D  E  E  A

CAATATTCACTGGGCGCGCCGTCTGACGGAAGCCGGTGTGCACGTCATCTTCTCCGCGCC 1560
 N  I  H  W  A  R  R  L  T  E  A  G  V  H  V  I  F  S  A  P

GGGGCTGAAAATTCACGCCAAGCTGTTCCTCATCTCCCGTAAAGAGGGTGACGATGTAGT 1620
 G  L  K  I  H  A  K  L  F  L  I  S  R  K  E  G  D  D  V  V

GCGCTATGCCCACATCGGTACCGGGAACTTTAACGAGAAAACTTCTCTAATTTATACCGA 1680
 R  Y  A  H  I  G  T  G  N  F  N  E  K  T  S  L  I  Y  T  D

CTACTCGCTCTTAACCGCCGACGCCCGCATCACTAACGAAGTGCGCCGGGTCTTTAACTT 1740
 Y  S  L  L  T  A  D  A  R  I  T  N  E  V  R  R  V  F  N  F

TATCGAAAACCCGTACCGTCCGGTGAGCTTTGACTATCTGCTGGTCTCGCCGCAGAACTC 1800
 I  E  N  P  Y  R  P  V  S  F  D  Y  L  L  V  S  P  Q  N  S

GCGTCGCCTGCTGTACGATATGATCGATAAAGAGATCGCCAATGCCCAGAAAGGGCTGTC 1860
 R  R  L  L  Y  D  M  I  D  K  E  I  A  N  A  Q  K  G  L  S

GTCCGGCATCACGCTGAAGCTCAACAACCTGGTCGACAAAGGGCTGGTGGACAGACTGTA 1920
 S  G  I  T  L  K  L  N  N  L  V  D  K  G  L  V  D  R  L  Y

TGCAGCGTCCAGCTCAGGCGTGCCGGTTAACCTGCTGATCCGCGGCATGTGCTCGCTGAT 1980
 A  A  S  S  S  G  V  P  V  N  L  L  I  R  G  M  C  S  L  I

CCCGGAACTGGAAGGCATCAGCGACAATATTCGCGTGATCAGCATCGTTGACCGTTACCT 2040
 P  E  L  E  G  I  S  D  N  I  R  V  I  S  I  V  D  R  Y  L

GGAACACGATCGGATCTATATTTTTGATAATGCGGGTGATAAACAGGTCTATCTCTCTTC 2100
 E  H  D  R  I  Y  I  F  D  N  A  G  D  K  Q  V  Y  L  S  S

GGCAGACTGGATGACGCGCAATATTGACTACCGTATTGAAGTCGCGGCACCGCTGCTGGA 2160
 A  D  W  M  T  R  N  I  D  Y  R  I  E  V  A  A  P  L  L  D

TCCGCGTCTGAAGCAGCAGATCCTCGACATCATCGAGATTCTGTTCAGCGATACCGTGAA 2220
 P  R  L  K  Q  Q  I  L  D  I  I  E  I  L  F  S  D  T  V  K

AGCACGCTATATCGACAAAGAACTCAGTAACCGCTATGTACCGCGCGGCAACCGCCGCAA 2280
 A  R  Y  I  D  K  E  L  S  N  R  Y  V  P  R  G  N  R  R  K

AGTGCGGTCGCAACTGGCGATTTACGACTATATCAAATCACTCGAGCAACCCGATTAACC 2340
 V  R  S  Q  L  A  I  Y  D  Y  I  K  S  L  E  Q  P  D  END
                                              XhoI
TATGCCGATAAATGATAAGACCCCACGCCCGCAGAA                         2376
```

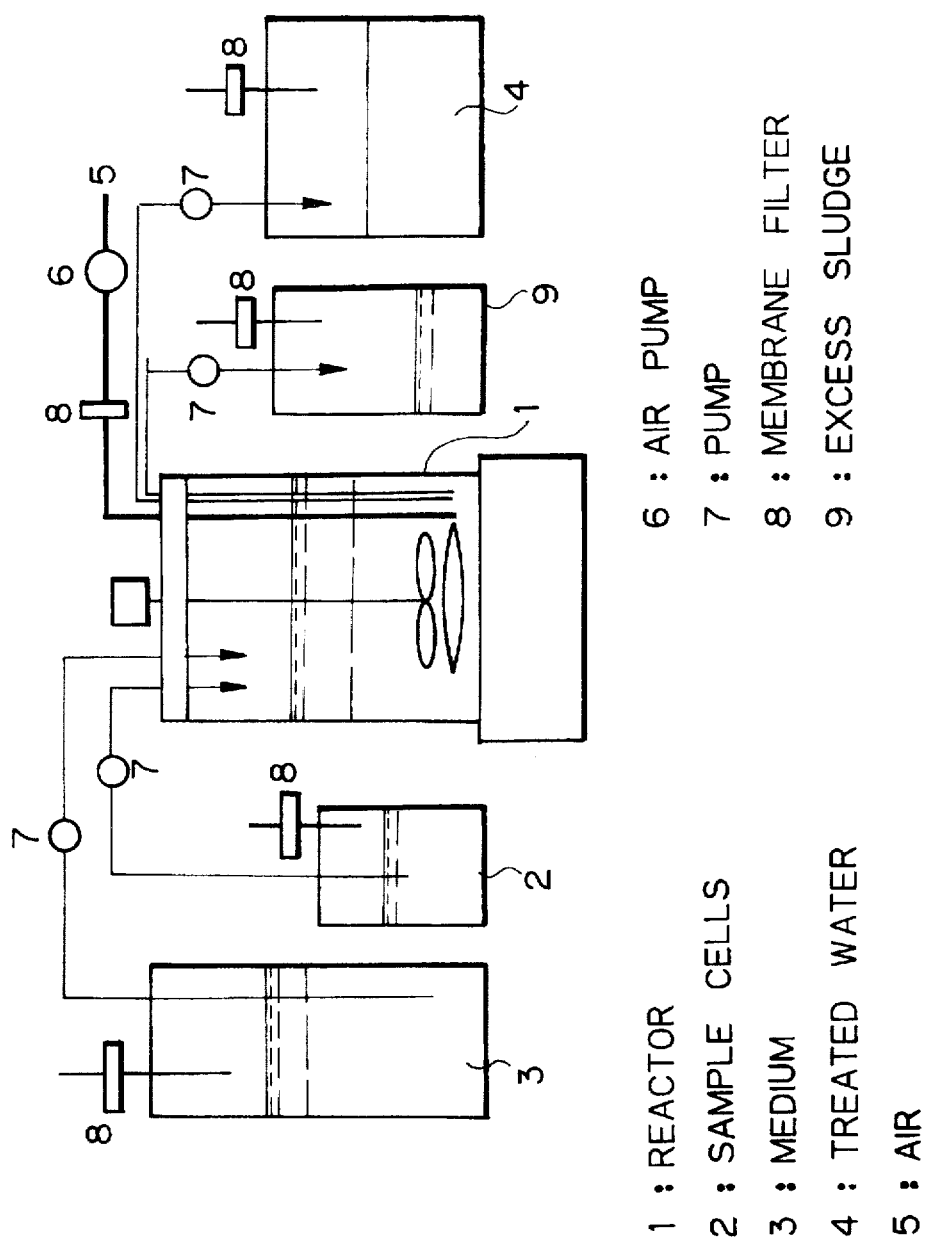

METHOD FOR TREATING WASTE WATER

This application is a Continuation of application Ser. No. 08/205,174, filed on Mar. 3, 1994, now abandoned.

BACKGROUND OF THE INVENTION

1. Field of the Invention

The present invention relates to a biological method of removing phosphorus wherein one-step removal of organic substances and phosphorus from phosphorus containing waste water is achieved by using novel microorganisms having enhanced abilities of taking up and accumulating phosphorus.

2. Prior Art

Eutrophication in closed water areas such as lakes, marshes and bays has long been regarded as a serious problem. Above all, phosphorus is the main limiting factor of algal growth and thus it is thought that, the most effective way to prevent eutrophication is to reduce the amount of phosphorus in waste water flowing into closed water areas as much as possible. Hence, extensive attempts have been made to develop techniques for removing phosphorus in waste water.

One technique for removing phosphorus from organic waste water containing both phosphorus and organic substances comprises so called "biological phosphorus-removing methods" in which phosphorus is removed by way of biological reactions. Great attention has been paid to biological phosphorus-removing methods since the early 1980's as they were expected to simultaneously remove organic substances and phosphorus from waste water without the need for any special apparatus or chemical agent.

In biological phosphorus-removing methods, it is of paramount importance to allow polyphosphate accumulating bacteria to become dominant in an activated sludge in order to consistently produce an activated sludge having a high phosphorus content, and this is particularly applied in methods which remove phosphorus from waste water by discharging excess sludge with a high phosphorus content out of the system, as typified by the anaerobic-aerobic method. In biological phosphorus-removing methods, an anaerobic tank is provided at the flow entrance of an aeration tank. In the anaerobic tank, microorganisms having a polyphosphate accumulating ability hydrolyze polyphosphate accumulated in cells under anaerobic conditions and take up organic substances in waste water to store them as cell substances while releasing phosphate out of the cells. In the aeration tank, the microorganisms take up phosphorus in the waste water and store it as polyphosphate in the cells while metabolizing the organic substances previously stored in the cells. For these reasons, polyphosphate accumulating bacteria can take up organic substances more effectively than other microorganisms and thus become dominant in the system.

In such a system, the phosphorus-removal rate is determined by the phosphorus content of an activated sludge as well as by the conversion rate of organic substances to sludge. The phosphorus content in the activated sludge is in turn determined by the amount of microorganisms having a polyphosphate accumulating ability and the efficiency of said microorganisms to accumulate polyphosphate. In the case of a conventional biological phosphorus-removing method, a certain amount of time is generally required to pass before the polyphosphate accumulating bacteria become dominant and it is often experienced that the phosphorus-removing ability of the system is not expressed as promptly as is desired. Further, even when a good phosphorus-removing ability has been expressed, phosphorus-removing functions can often be interrupted as a result of minor errors in maintenance or control of the system, particularly when waste water contains high concentrations of organic substances and phosphorus. In such a case, phosphorus remains in the waste water, with a great amount of time being required to restore the normal conditions if the conditions are serious.

As described above, though biological phosphorus-removing methods show promise in waste water treatment due to their ability to remove both organic substances and phosphorus in a secondary process, they suffer from drawbacks in that they require a certain amount of time before sufficient phosphorus-removing performance is exhibited and that great care must be taken in their maintenance and control.

SUMMARY OF THE INVENTION

In order to solve the above problems, it is necessary to ensure that polyphosphate accumulating microorganisms become dominant in a waste water treatment system and that said microorganisms consistently express their polyphosphate accumulating ability regardless of surrounding conditions.

The present invention provides a waste water treatment method using a microorganism having an improved polyphosphate accumulating ability, the most important factor in the phosphorus-removing method.

BRIEF DESCRIPTION OF THE DRAWINGS

FIG. 3 shows the first half of the nucleotide sequence of the polyphosphate kinase gene of *Klebsiella aerogenes* ATCC9621;

FIG. 4 shows the latter half of the nucleotide sequence of the polyphosphate kinase gene of *Klebsiella aerogenes* ATCC9621 following FIG. 3;

FIG. 6 is a schematic diagram of the phosphorus-removing test device with which the microorganism of the present invention is used. Main numbers in FIG. 6 indicate the following elements:

Figure 1:
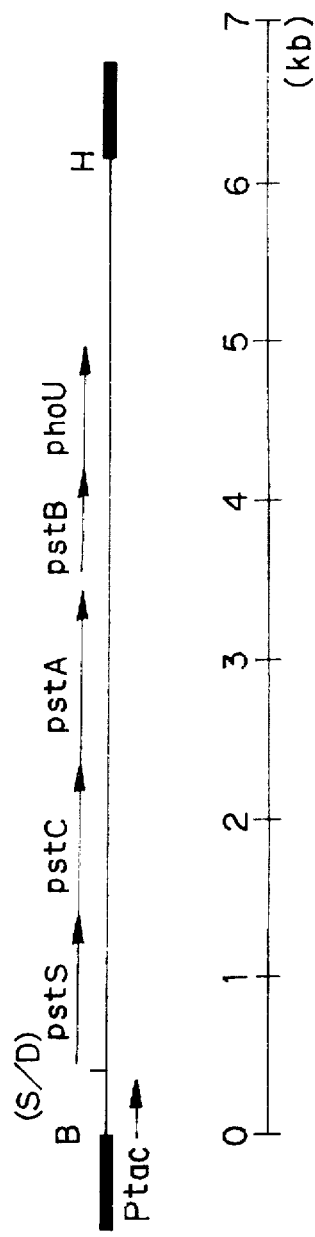
FIG. 1 illustrates the construction of plasmid pEP02.2.

1: Reactor
2: Sample cells
3: Medium
4: Treated water
5: Air
6: Air pump
7: Pump
8: Membrane filter
9: Excess sludge.

DETAILED DESCRIPTION OF THE INVENTION

In accordance with the present invention, organic substances and phosphorus in waste water are removed by a microorganism the ability of which to take up and accumulate phosphorus has been enhanced by transformation. The transformation is effected by means of one or more self-replicating vectors carrying at least one DNA fragment selected from the group consisting of a) a DNA fragment containing a gene or genes related to phosphate transport through cell membranes, b) a DNA fragment containing a structural gene of polyphosphate kinase, and c) a DNA fragment containing a structural gene of an enzyme related to ATP supply in cells; provided that use of a self-replicating vector carrying DNA fragment of b) alone is excluded. The transformed microorganism may be directly brought into contact with waste water to be treated or a mixture of said microorganism and activated sludge may be allowed to come into contact with waste water.

Thus, the present invention provides a method for treating waste water comprising the steps of:

providing at least one DNA fragment selected from the group consisting of a DNA fragment containing a gene or a set of genes related to phosphate transport through cell membranes (referred to as DNA fragment (a)), a DNA fragment containing a structural gene of polyphosphate kinase (referred to as DNA fragment (b)) and a DNA fragment containing a structural gene of an enzyme related to ATP supply in cells (referred to as DNA fragment (c));

providing one or more vectors containing a DNA fragment having self-replicating ability:

ligating at least one DNA fragments selected from DNA fragments (a), (b) and (c) in any combination to the above one or more vectors in a manner allowing expression of the genes in said ligated DNA fragment (s), except that a selection of DNA fragment (b) alone is excluded:

introducing said one or more vectors into a microorganism host for transformation in order to enhance the ability of the microorganism to take up or accumulate phosphorus:

removing organic substances and phosphorus in waste water by allowing said microorganism to come into contact with waste water.

In one embodiment of the method of the invention, at least one of DNA fragments (a), (b) and (c) are contained in the same vector to be introduced to the microorganism host.

In another embodiment of the method of the invention, at least one of DNA fragments (a), (b) and (c) are contained in at least two different vectors to be introduced to the microorganism host.

In preferred embodiments of the waste water treatment method of the present invention, organic substances and phosphorus in waste water are removed with consistently high efficiency by the microorganism provided with improved abilities to take up and accumulate phosphorus by way of transformation with a plasmid vector carrying the following combination of DNA fragments:

a vector DNA fragment having self-replicating ability (fragment (z)), and a DNA fragment containing genes related to phosphate transport through cell membranes (fragment (a));

a vector DNA fragment having self-replicating ability (fragment (z)), and a DNA fragment containing a structural gene of polyphosphate kinase (fragment (b));

a vector DNA fragment having self-replicating ability (fragment (z)), a DNA fragment containing genes related to phosphate transport through cell membranes (fragment (a)) and a DNA fragment containing a structural gene of polyphosphate kinase (fragment (b));

a vector DNA fragment having self-replicating ability (fragment (z)), a DNA fragment containing a structural gene of polyphosphate kinase (fragment (b)), and a DNA fragment containing a structural gene of an enzyme related to ATP supply in cells (fragment (c));

a vector DNA fragment having self-replicating ability (fragment (z)), a DNA fragment containing genes related to phosphate transport through cell membranes (fragment (a)), a DNA fragment containing a structural gene of polyphosphate kinase (fragment (b)), and a DNA fragment containing a structural gene of an enzyme related to ATP supply in cells (fragment (c));

a vector DNA fragment having self-replicating ability (fragment (z)), and a DNA fragment containing a structural gene of an enzyme related to ATP supply in cells (fragment (c)); or a vector DNA fragment having self-replicating ability (fragment (z)), a DNA fragment containing genes related to phosphate transport through cell membranes (fragment (a)), and a DNA fragment containing a structural gene of an enzyme related to ATP supply in cells (fragment (c)).

Sources of DNA fragments (a) are preferably procaryotic genes related to phosphate transport through cell membranes. As specific examples are mentioned genes derived from the phosphate transport (Pst) operon of *Escherichia coli* (B. P. Surin, H. Rosenberg, and G. B. Cox: Phosphate specific transport system of *Escherichia coli:* nucleotide sequence and gene-polypeptide relationships, J. of Bacteriol., Vol. 161, pp. 189–198, 1985). Above all, specifically preferred examples include DNA fragments of genes derived from the Pst operon which are respectively contained in the microorganisms of FERM BP-4388 and FERM BP-4389 deposited at National Institute of Bioscience & Human Technology.

As non-limiting examples of vectors capable of providing a vector DNA fragment having self-replicating ability (fragment (z)) can be mentioned plasmid vectors pUC118, pUC119, pBR322 and the like for *Escherichia coli* hosts; and plasmid vector pMMB66EH and the like for hosts of the genus Klebsiella. These plasmids vectors are commercially available.

The term "a vector DNA fragment having self-replicating ability" in the specification is used to mean that the specific vector is able to replicate when one or more DNA fragments (a), (b) and (c) have been ligated therein. For example, when pBR322 is used, the vector should contain the replication origin of pBR322 or an alternative replication origin.

As those skilled in the art will readily appreciate, DNA fragments (a), (b) and/or (c) must be ligated into the one or more vectors in such a manner that the genes contained in these fragments will be expressed when an appropriate vector is transfected with said one or more vectors. This is within ordinary skill in the art.

Sources of DNA fragments of (b) are preferably procaryotic polyphosphate kinase genes, and as one specific example can be mentioned the polyphosphate kinase gene of *Escherichia coli* (M. Akiyama, E. Crooke, and A. Kornberg: The Polyphosphate Kinase Gene of *Escherichia coli*, The Journal of Biological Chemistry, Vol. 267, No. 31, Issue of November 5, pp. 22556–22561, 1992).

Moreover, preferred microorganisms as sources of DNA fragments (b) are those of strains belonging to procaryotes and are capable of producing a polyphosphate kinase. More specifically, they are microorganisms which having high catalytic activities in the reaction where a phosphate group in ATP is transferred to a polyphosphate chain, i.e. a phosphate polymer, to produce a longer polyphosphate chain and/or in the reverse reaction where a phosphate group of a polyphosphate chain is transferred to ADP to produce ATP;

or mutants of such microorganisms. Specific examples having these properties include the microorganisms belonging to the following genera: Klebsiella, Propionibacterium, Corynebacterium, Aerobacter, Alcaligenes, and Micrococcus. As a particularly preferred example can be mentioned genus Klebsiella.

Preparing of a DNA fragment containing a structural gene of polyphosphate kinase from the chromosome of the above mentioned microorganisms may be conducted by an appropriate conventional method.. For example, chromosome is digested with one or more restriction enzymes such as XhoI, KpnI, HindIII or ClaI. DNA fragments are inserted in a self-replicating vector plasmid. Microorganisms transformed with the plasmid are screened for their ability to produce a polyphosphate kinase. An alternative and more convenient method employs an already available polyphosphate kinase gene as a probe. DNA fragments hybridizes to the probe may be selected and isolated by Southern hybridization or the like. A specific example of a polyphosphate kinase gene which can be employed as the probe includes, for example, the polyphosphate kinase gene of Escherichia described in M. Akiyama, E. Crooke, and A. Kornberg (Supra). By this method, the present inventors have isolated and characterized the DNA fragment containing the novel polyphosphate kinase structural gene of *Klebsiella aerogenes* ATCC9621 (refer to SEQ ID NO:1 and FIGS. 3 and 4). Said fragment is contained in the microorganism FERM BP-4387 deposited at National Institute of Bioscience & Human Technology.

As sources of DNA fragments (c), genes of enzymes related to ATP supply in procaryotic cells are preferred. Specific examples include DNA fragments encoding the activity of acetate kinase (A. Matsuyama, H. Yamamoto, and E. Nakano: Cloning, expression, and nucleotide sequence of the *Escherichia coli* K-12 ackA gene, J. Bacteriol., Vol. 171, No. 1, pp. 577–580, 1989), pyruvate kinase (O. Ohara, R. L. Dorit, and W. Gilbert: Direct genomia sequencing of bacterial DNA: The pyruvate kinase I gene of *Escherichia coli*, Proc. Acad. Sci. USA, Vol. 86, No. 18, pp. 6883–6887, 1989) and carbamate kinase (M. Klley-Raymann, D. Haas, C. V. Wauven, and A. Pirard: *Pseudomonas aeruginosa* mutants affected in anaerobic growth on arginine: Evidence for a four-gene cluster encoding the arginine deiminase pathway, J. Bacteriol., Vol. 160, No. 3, pp. 928–934, 1984).

Specific examples of plasmids with which microorganisms are transformed in the present invention to improve the ability to take up and accumulate phosphorus include the following:

The plasmid which comprises a DNA fragment containing the phosphate intake channel Pst system from *Escherichia coli* as genes related to phosphate transport through cell membranes and a DNA fragment derived from pKTY321 as the vector DNA fragment having self-replicating ability. This plasmid is contained in the microorganism FERM BP-4388 deposited at National Institute of Bioscience & Human Technology and was named "pEP02.2" by the present inventors;

The plasmid which comprises a DNA fragment containing the phosphate intake Pst system from *Escherichia coli* as genes related to phosphate transport through cell membranes and a DNA fragment derived from pSTV28 as the vector DNA fragment having self-replicating ability. This plasmid is contained in microorganism FERM BP-4389 deposited at National Institute of Bioscience & Human Technology and was named "pP05" by the present inventors;

The plasmid which comprises a DNA fragment containing the structural gene of the polyphosphate kinase of *Klebsiella aerogenes* (discovered by the inventors as stated above), a DNA fragment containing the structural gene of the acetate kinase of *Escherichia coli* as an enzyme related to ATP supply in cells and the DNA fragment derived from pUG118 as a vector DNA fragment having self-replicating ability. This plasmid was named "pKP03" by the present inventors; and The plasmid which comprises a DNA fragment containing the structural gene of the polyphosphate kinase of *Klebsiella aerogenes* and the DNA fragment derived from pUC119 as a vector DNA fragment having self-replicating ability is contained in microorganism FERM BP-4387 deposited at National Institute of Bioscience & Human Technology and was named "pKP02" by the present inventors.

Examples of microorganisms (hosts) whose phosphorus intaking and accumulating abilities will be enhanced in the present invention by the transformation with the plasmid vector containing above DNA fragments include *Escherichia coli* as well as microorganisms of genuses Pseudomonas, Alcaligenes and Klebsiella. As a specific microorganism can be mentioned *Escherichia coli* strain MV1184. "Microorganisms having enhanced abilities of taking up and accumulating phosphorus" herein includes both microorganisms which have come to possess the ability to take up and accumulate phosphorus due to the transformation though otherwise they do not possess such abilities, and microorganisms, the ability of which to take up and accumulate phosphorus has significantly been enhanced compared with those without transformation.

Introduction of the plasmid vector for effecting transformation can be carried out in accordance with any of the conventional techniques.

Organic substances and phosphorus in waste water can be removed consistently with high efficiency by the microorganism which has been transformed with the above mentioned plasmid. For example, in order to remove organic substances and phosphorus from waste water with high efficiency, cells of the transformed microorganism can be grown and acclimatized to the conditions of water to be treated for a certain period, and the cells can be supplied periodically to the activated sludge in an amount dictated by the concentrations of organic substance and phosphorus in water to be treated.

The present invention will be further described by way of specific examples. However, it should be noted that the present invention is not limited thereto since various modifications will be apparent to those skilled in the art in view of the description and the drawings.

EXAMPLE 1
Preparation of Plasmid pEP02.2

Chromosomal DNA was obtained from *Escherichia coli* strain MV1184, and fragments of 7 kb were separated from DNA fragments formed by digestion with restriction enzymes EcoRI and HindIII. The DNA fragments and plasmid pBR322 which had been cleaved with EcoRI and HindIII were ligated in accordance with the method of Schleif et al. (R. F. Schleif and P. C. Wewnsink: Practical methods in molecular biology, Springer-Verlag New York Inc., 1981).

With the resultant plasmid mixture, *Escherichia coli* strain ANCC75 which lacked PstS, a member of the Pst operon, was transformed by the method of Sambrook et al. (J. Sambrook, E. F. Fritsch, and T. Maniatis: Molecular cloning: a laboratory manual, 2nd ed., Cold Spring Harbor Laboratory, Cold Spring Harbor, N.Y., 1989). A colony having an enhanced phosphate intaking ability was selected from among the 156 recombinant colonies. The plasmid in the clone was digested with restriction enzymes DraI and HindIII, and the resulted 6 kb DNA fragment was ligated with plasmid pKK223-3 which had been cleaved with restriction enzymes SmaI and HindIII.

The plasmid mixture was used to transform *Escherichia coli* MV1184, and a colony which contained a plasmid having the 6 kb DNA fragment therein to the downstream of tac promoter was selected from among 65 recombinant colonies. The plasmid in the clone was further cleaved with BamHI and HindIII, a DNA fragment of 6.2 kb was separated and the fragment was ligated in the above manner to plasmid pKTY321 which had been cleaved with BamHI and HindIII. With the resulted plasmid mixture, *Escherichia coli* MV1184 was transformed and the colony with the highest phosphate intaking activity was selected from among 43 recombinant white colonies. The plasmid contained in the clone was named pEP02.2. The *Escherichia coli* strain MV1184 containing this plasmid was deposited at National Institute of Bioscience & Human Technology under accession number FERM BP-4388 on Aug. 19, 1993. The construction of the plasmid is shown in FIG. 1. In FIG. 1, pstS is the region encoding the phosphate binding protein; pstC, pstA and pstB are regions encoding the phosphate transporter subunits; and phoU is a component involved in the negative control of phosphate regulon. These components as a whole constitute the Pst operon. The other symbols in FIG. 1 indicate the following meanings:

Ptac: tac promoter

B: BamHI site

H: HindII site (S/D): SmaI and DraI sites

Further, the tac promoter of plasmid pEP02.2 was substituted with the promoter of tetracycline resistant gene derived from pBR322 to prepare a plasmid capable of constitutively expressing the product of the inserted DNA, and the plasmid was named pP05. The *Escherichia coli* strain MV1184 containing this plasmid was deposited at National Institute of Bioscience & Human Technology under accession number FERM BP-4389 on Aug. 19, 1993.

EXAMPLE 2

Preparation of Plasmid pKP02 and Sequence Analysis of Polyphosphate Kinase Gene of Klebsiella aerogenes ATCC9621

*Klebsiella aerogenes* ATCC9621 was cultured, harvested and washed. The cells were then subjected to lysis, deproteinization and RNase treatment by conventional manner to provide a DNA library. The library was digested with XhoI and the digest was separated by electrophoresis on an agarose gel. DNA fragments of about 2.0 to 3.0 kb were extracted from the gel. The DNA fragments were ligated to plasmid pUC119 which had been cleaved with SalI, by a reaction as described in Example 1.

Figure 2:
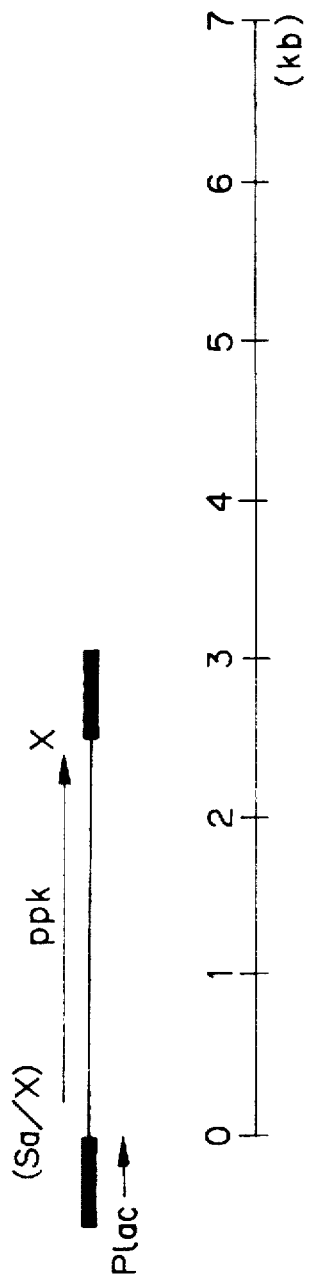
FIG. 2 illustrates the construction of plasmid pKP02.

The thus prepared plasmid mixture was mixed with competent cells of *Escherichia coli* MV1184, and layered on a 2×TY plate containing 0.5 mM isopropylthiobetagalactoside, 50 mg/l 5-bromo-4-chloro-3-indolyl-D-galactoside and ampicillin and the cells were cultured. One colony appeared which contained a recombinant plasmid capable of hybridizing to the polyphosphate kinase gene of *Escherichia coli* described in Akiyama et al. (M. Akiyama, E. Crooke, and A. Kornberg: The Polyphosphate Kinase Gene of *Escherichia coli*, The Journal of Biological Chemistry, Vol. 267, No. 31, Issue of Nov. 5, pp. 22556–22561, 1992) and this colony was selected from among 58 recombinant white colonies. The plasmid was named pKP02. The *Escherichia coli* strain MV1184 containing this plasmid was deposited at National Institute of Bioscience & Human Technology under accession number FERM BP-4387 on Aug. 19, 1993. The construction of the plasmid is shown in FIG. 2. The symbols in FIG. 2 indicate the following meanings:

ppk: Polyphosphate kinase gene

Plac: lac promoter

X: XhoI site (Sa/X): SalI and XhoI sites

The revealed nucleotide sequence of the polyphosphate kinase gene of *Klebsiella aerogenes* ATCC9621 is shown in FIG. 3 and FIG. 4 in succession.

EXAMPLE 3

Preparation of Plasmids PEP03 and PKP03

Chromosomal DNA from *Escherichia coli* K-12 was digested with PstI and MulI and separated on an agarose gel by electrophoresis. DNA fragments of about 4.0 to 5.0 kb were extracted from the gel and the fragments were mixed with plasmid pUC18 which had been cleaved with PstI and SmaI in order to allow ligation.

With the thus formed plasmid mixture, *Escherichia coli* MV1184 was transformed, and selection was conducted. The probe used in the selection comprised an oligonucleotide containing the DNA sequence of the acetate kinase gene of *Escherichia coli* described in Matsuyama et al. (A. Matsuyama, H. Yamamoto, and E. Nakano: Cloning, expression, and nucleotide sequence of the *Escherichia coli* K-12 ackA gene, J. Bacteriol., Vol. 171, No. 1, pp. 577–580, 1989). As a result, 17 colonies were found to contain recombinant plasmids hybridizing with the probe, and they were selected from among 256 recombinant white colonies. Further, the single colony with the highest acetate kinase activity of these 17 colonies was selected. The plasmid contained in this strain was named pEP03.

DNA fragments obtained by digesting plasmid pEP03 with MulI and PstI were ligated to plasmid pKP02 which had been cleaved with XohI.

Figure 5:
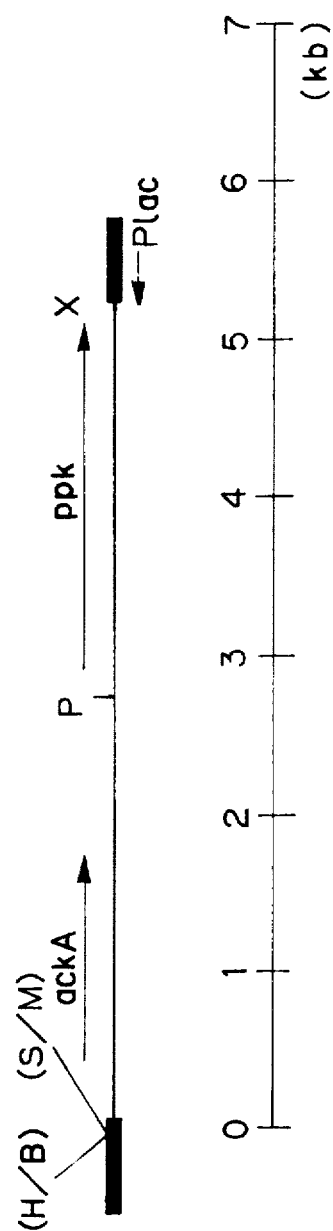
FIG. 5 illustrates the construction of plasmid pKP03.

With the thus prepared plasmid mixture, *Escherichia coli* MV1184 was transformed in accordance with the method of Sambrook et al. (supra). Using plasmid pKP02 as a probe, 3 colonies which contained recombinant plasmids hybridizing with the probe were selected from among 80 recombinant white colonies. Further, the colony with the highest acetate kinase activity of the three colonies was selected. The plasmid contained in the clone was named pKP03. The construction of this plasmid is shown in FIG. 5. The symbols in FIG. 5 indicate the following meanings:

ppk: Polyphosphate kinase gene ackA: Acetate kinase gene

Plac: lac Promoter p: PstI site

X: XhoI site (S/M): SmaI and MluI sites

EXAMPLE 4

Expression of Phosphorus-Removing Activity of Transformants Using Plasmids pEP02.2, pKP03, pEP03 and pKP02

*Escherichia coli* strain MV1184 was transformed with the following plasmids in conventional manner: plasmid pEP02.2; plasmid pEP02.2 and the plasmid pKP02; plasmid pKP03; plasmid pKP02 and plasmid pEP03; plasmid pEP02.2 and plasmid pEP03; plasmid pKP02, plasmid pEP02.2 and plasmid pEP03; plasmid pEP03; and plasmid pEP02.2 and plasmid pKP03. After being pre-cultured in an L-broth the transformants were inoculated in a $T_{0.4}$— medium shown in Table 1 and cultured for 6 hours. Samples were periodically drawn from the cultures to measure the cell and phosphorus concentrations in the mediums. In addition, Escherichia coli without polyphosphate kinase structural gene and Escherichia coli containing plasmid pKP02 with a DNA fragment of the polyphosphate kinase structural gene were included as controls, and their activities with regard to phosphorus-removal were measured likewise. The Escherichia coli hosts having respective plasmid(s) will be designated by capital letters as shown in Table 2. The table summarizes the results of the phosphorus-removing activity measurements, together with the plasmids contained in the transformants and the designation of the hosts.

TABLE 1

| Composition of $T_{0.4}$-Medium | |
| --- | --- |
| Glucose | 2 g/l |
| NaCl | 2 g/l |
| $NH_4Cl$ | 1 g/l |
| $Na_2SO_4$ | 0.1 g/l |
| $MgCl_2.6H_2O$ | 10 mg/l |
| $CaCl_2.6H_2O$ | 10 mg/l |
| $FeCl_2$ | 1 mg/l |
| Tris | 10 g/l |
| Thiamine.HCl | 20 mg/l |
| Potassium phosphate | 0.4 mM |
| pH 7.6 | |

TABLE 2

Phosphorus-Removing Activities of transformants containing Plasmids

| Plasmid | cell designation | Amount of removed phosphorus (mg/l) | Phosphorus content (mg/P/g dry cell) | relative phosphorus removal rate (mg/(g·h)) |
| --- | --- | --- | --- | --- |
| pUC118 | Control | 4.2 | 20 | 4.2 |
| pKP02 | (P) | 7.6 | 30 | 5.5 |
| pEP02.2 | (A) | 9.5 | 42 | 8.0 |
| pEP02.2 + pKP02 | (B) | 10.0 | 182 | 28.5 |
| pKP03 | (C) | 11.5 | 60 | 12.0 |
| pEP02.2 + pKP0-3 | (D) | 12.5 | 145 | 21.0 |
| pEP03 | (E) | 5.4 | 28 | 4.7 |
| pKP02 + pEP03 | (F) | 9.6 | 48 | 9.5 |
| pEP02.2 + pEP03 | (G) | 8.4 | 32 | 7.4 |
| pKP02 + pEP02.2 + pEP03 | (H) | 11.8 | 130 | 17.6 |

EXAMPLE 5
Test for Removing Phosphorus in Waste Water by Addition of a Microorganism Transformed with Novel Plasmids Escherichia coli transformed with plasmid pEP02.2 was cultured in an LB medium at 37° C., and all cells were harvested, washed and suspended in synthetic waste water with the composition shown in Table 3 at a concentration of 5.0 g/l, and cultured at 20° C. for 5 hours (hereinafter referred to as transformant (A)).

Escherichia coli transformed with plasmid pEP02.2 and plasmid pKP02 was cultured, harvested and washed in the same manner as above, and then suspended in the synthetic waste water at a concentration of 5.0 g/l, and cultured at 20° C. for 5 hours (hereinafter referred to as transformant (B)).

Escherichia coli transformed with plasmid pKP03 was cultured, harvested and washed in the same manner as above, and then suspended in the synthetic waste water at a concentration of 5.0 g/l, and cultured at 20° C. for 5 hours (hereinafter referred to as transformant (C)).

Escherichia coli transformed with plasmid pEP02.2 and plasmid pKP03 was cultured, harvested and washed in the same manner as above, and then suspended in the synthetic waste water at a concentration of 5.0 g/l, and cultured at 20° C. for 5 hours (hereinafter referred to as transformant (D)).

Escherichia coli transformed with plasmid pEP03 was cultured, harvested and washed in the same manner as above, and then suspended in the synthetic waste water at a concentration of 5.0 g/l, and cultured at 20° C. for 5 hours (hereinafter referred to as transformant (E)).

Escherichia coli transformed with plasmid pKP02 and plasmid pEP03 was cultured, harvested and washed in the same manner as above, and then suspended in the synthetic waste water at a concentration of 5.0 g/l, and cultured at 20° C. for 5 hours (hereinafter referred to as transformant (F)).

Escherichia coli transformed with plasmid pEP02.2 and plasmid pEP03 was cultured, harvested and washed in the same manner as above, and then suspended in the synthetic waste water with the composition shown in Table 3 at a concentration of 5.0 g/l, and cultured at 20° C. for 5 hours (hereinafter referred to as transformant (G)).

Escherichia coli transformed with plasmid pKP02, plasmid pEP02.2 and plasmid pEP03 was cultured, harvested and washed in the same manner as above, and then suspended in the synthetic waste water at a concentration of 5.0 g/l, and cultured at 20° C. for 5 hours (hereinafter referred to as transformant (H)).

Escherichia coli transformed with plasmid pKP02 by ordinary manner was cultured, harvested and washed in the same manner as above, and then suspended in the synthetic waste water at a concentration of 5.0 g/l, and cultured at 20° C. for 5 hours (hereinafter referred to as transformant (P)).

Next, a phosphorus-removal test was carried out by the apparatus shown in FIG. 6. Into the reaction tank was introduced 1500 ml of activated sludge collected from an aeration tank of a sewage treatment plant being operated by a conventional activated sludge method. The composition of the synthetic waste water is shown in Table 3. Experiments were carried out under fill-and draw conditions, i.e., a repetition of four cycles a day and each cycle comprised 5.0 hours aeration and 1.0 hour settling period. During the first 5 minutes of the aeration, 125 ml of the medium and 4 ml of transformant (A) were added in the reactor, and during the last 10 minutes of the settling period, 125 ml of the supernatant (hereinafter referred to as treated water) was sampled. Excess sludge was drawn out once a day so that the concentration of the activated sludge in the reactor would be maintained at 5000 mg/l. The amount of potassium phosphate ($KH_2PO_4$) added to the synthetic waste water to be treated was gradually increased after the phosphorus content in treated water had consistently become 0.1 mg/l or less.

With respect to each of the transformants (B), (C), (D), (E), (F), (G) and (H), a similar fill-and-draw test was carried out. With respect to the transformant (P), a similar test was carried out as a control with respect to transformation.

In addition, the two control test systems were included. Control system I comprised the four cycles a day of 5.0 hours aeration and 1.0 hour settling period in the fill-and-draw system but without introduction of cells (hereinafter referred to as control system (I)). Control system II comprised four cycles a day of 1.5 hours anaerobic agitation, 3.5 hours aeration and 1.0 hour settling period in the batchwise biological phosphorus removal method (anaerobic-aerobic method).

The results of the phosphorus-removal tests are summarized in Table 4.

TABLE 3

| Synthesis Waste Water Composition | |
|---|---|
| Acetic acid | 1.0 ml |
| Glucose | 200 mg |
| Polypeptone | 600 mg |
| Yeast extract | 60 mg |
| $NaHCO_3$ | 200 mg |
| KCl | 400 mg |

TABLE 3-continued

| Synthesis Waste Water Composition | |
|---|---|
| $MgSO_4.7H_2O$ | 450 mg |
| $CaCl_2.2H_2O$ | 150 mg |
| $KH_2PO_4$ | 0–88 mg* |
| Distilled water | 1000 ml |

*Phosphorus concentration was varied as appropriate.

TABLE 4

Results of Phosphorus Removal Tests

| Trans-formant | Phosphorus Content | Test Period (days) | | | | | |
|---|---|---|---|---|---|---|---|
| | | 0–10 | 11–20 | 21–30 | 31–40 | 41–50 | 51–60 |
| (P) | waste water (mg/l) | 25.0 | 25.0 | 25.0 | 35.0 | 45.0 | 65.0 |
| | treated water (mg/l) | 5.6 | 3.2 | 0.1 | 0.1 | 0.1 | 0.1 |
| | activated sludge (%) | 3.02 | 3.88 | 4.16 | 4.96 | 5.12 | 5.34 |
| (A) | waste water (mg/l) | 25.0 | 25.0 | 35.0 | 35.0 | 45.0 | 65.0 |
| | treated water (mg/l) | 2.5 | 0.2 | 1.6 | 0.1 | 0.1 | 0.1 |
| | activated sludge (%) | 2.78 | 3.95 | 4.56 | 5.04 | 5.42 | 5.79 |
| (B) | waste water (mg/l) | 25.0 | 35.0 | 45.0 | 65.0 | 85.0 | 85.0 |
| | treated water (mg/l) | 0.8 | 0.1 | 0.1 | 0.1 | 0.1 | 0.1 |
| | activated sludge (%) | 3.35 | 5.32 | 6.64 | 6.92 | 7.38 | 7.94 |
| (C) | waste water (mg/l) | 25.0 | 35.0 | 45.0 | 35.0 | 35.0 | 35.0 |
| | treated water (mg/l) | 1.2 | 0.2 | 8.9 | 2.6 | 1.2 | 0.2 |
| | activated sludge (%) | 3.20 | 4.36 | 4.78 | 4.68 | 4.70 | 4.84 |
| (D) | waste water (mg/l) | 25.0 | 35.0 | 35.0 | 45.0 | 45.0 | 65.0 |
| | treated water (mg/l) | 0.4 | 2.3 | 0.1 | 3.8 | 0.2 | 5.6 |
| | activated sludge (%) | 3.26 | 4.28 | 4.84 | 5.31 | 5.69 | 5.97 |
| (E) | waste water (mg/l) | 25.0 | 35.0 | 35.0 | 45.0 | 45.0 | 65.0 |
| | treated water (mg/l) | 0.2 | 1.5 | 0.1 | 4.6 | 0.2 | 7.2 |
| | activated sludge (%) | 3.51 | 4.86 | 4.99 | 5.21 | 5.38 | 5.56 |
| (F) | waste water (mg/l) | 25.0 | 25.0 | 35.0 | 35.0 | 45.0 | 45.0 |
| | treated water (mg/l) | 2.3 | 0.2 | .24 | 0.2 | 3.8 | 8.9 |
| | activated sludge (%) | 3.00 | 3.35 | 4.03 | 4.23 | 5.60 | 5.20 |
| (G) | waste water (mg/l) | 25.0 | 25.0 | 35.0 | 35.0 | 45.0 | 45.0 |
| | treated water (mg/l) | 1.8 | 0.1 | 1.4 | 0.2 | 2.7 | 1.2 |
| | activated sludge (%) | 3.16 | 3.74 | 4.23 | 5.01 | 5.37 | 5.62 |
| (H) | waste water (mg/l) | 25.0 | 35.0 | 45.0 | 35.0 | 35.0 | 45.0 |
| | treated water (mg/l) | 1.6 | 0.2 | 2.8 | 4.7 | 0.2 | 7.8 |
| | activated | 3.04 | 4.12 | 4.61 | 4.23 | 4.58 | 4.88 |

TABLE 4-continued

Results of Phosphorus Removal Tests

| Trans-formant | Phosphorus Content | Test Period (days) | | | | | |
|---|---|---|---|---|---|---|---|
| | | 0–10 | 11–20 | 21–30 | 31–40 | 41–50 | 51–60 |
| Cont. (I) | sludge (%) waste water (mg/l) | 25.0 | 15.0 | 15.0 | 15.0 | 15.0 | 15.0 |
| | treated water (mg/l) | 19.2 | 11.3 | 8.7 | 8.7 | 8.4 | 8.7 |
| | activated sludge (%) | 2.05 | 2.16 | 2.21 | 2.24 | 2.26 | 2.30 |
| Cont. (II) (anaero-bic-aerobic) | waste water (mg/l) | 25.0 | 25.0 | 15.0 | 25.0 | 25.0 | 35.0 |
| | treated water (mg/l) | 11.6 | 8.7 | 0.2 | 0.3 | 0.2 | 2.0 |
| | activated sludge (%) | 2.16 | 2.52 | 2.21 | 2.48 | 3.62 | 4.49 |

As is apparent from Table 4, in control system (I) which was operated in accordance with the fill-and-draw method comprised of 5.0 hours of aeration and 1.0 hour of settling period, but using ordinary activated sludge only, phosphorus continuedly remained in treated water at the initial phosphorus concentration in the supplied waste water (25.0 mg/l). Thus, the phosphorus content in supplied waste water was reduced to 15 mg/l from the 11th day onwards the commencement of the test. However, no phosphorus-removing activity was observed. In control system (II) wherein the biological phosphorus-removal method was performed, but using ordinary activated sludge only, phosphorus continuedly remained in treated water at the initial phosphorus concentration in the supplied waste water (25.0 mg/l). Thus, the phosphorus content in supplied waste water was reduced to 15 mg/l on the 21st day from the commencement of the test, and a phosphorus-removing ability was exerted, i.e., the phosphorus concentration in treated water became 0.1 mg/l. However, when the phosphorus content of the supplied waste water was increased gradually after the expression of the phosphorus-removing ability, phosphorus came to remain in the treated water.

On the other hand, in the system containing transformant (P), a transformant with the vector containing plasmid pKP02, a phosphorus-removing ability was expressed promptly even though an anaerobic aerobic cycle was not included. Further, the expression of the phosphorus-removing ability was even more prompt than in control system (II) of the biological phosphorus-removing operation, and the quality of the treated water was main-tained stably even after the phosphorus content in supplied waste water was increased.

Moreover, in the system containing transformant (B), whose abilities to take up and accumulate phosphorus were improved in accordance with the present invention, a phosphorus-removing activity was expressed promptly although the biological phosphorus-removing operation did not include an anaerobic aerobic cycle, as in the system of transformant (P). Further, the expression of the phosphorus-removing ability was even more prompt than in the system of transformant (P), and the quality of the treated water was maintained stably even after the phosphorus content in supplied waste water was increased. Besides, the phosphorus content in the active sludge increased by about 1.8 times of that in the system of transformant (P). In addition, in the systems of transformants (A), (C), (D), (E), (F), (G) and (H), the phosphorus-removing performance was greater than that of control system (II) of the biological phosphorus-removing operation, though some variation was observed in the phosphorus-removing activities.

Incidentally, a removal ratio of more than 95% of organic substances could be achieved in every system.

The method of the present invention is characterized by utilizing microorganisms whose abilities to take up and accumulate phosphorus were greatly improved. Hence, phosphorus and organic substances in waste water can be consistently removed by simply adding the transformed microorganism according to the method of the present invention into activated sludge.

What is claimed is:

1. A method of removing organic substances and phosphorus from waste water, comprising:

culturing a microorganism in a waste water, said microorganism comprising a host microorganism selected from the group consisting of E. coli, Pseudomonas, Alcaligenes and Klebsiella, transformed with one or more vector plasmids comprising a self-replicative DNA fragment containing at least one member selected from the group consisting of (a) an E. coli PST operon, (b) an E. coli polyphosphate kinase gene or a K. aerogenes polyphosphate kinase gene, and (c) an E. coli acetate kinase gene or an E. coli pyruvate kinase gene, excluding said self-replicative DNA fragment containing (b) alone; and separating said microorganism from said waste water.

2. The method of claim 1, wherein said E. coli PST operon is the PST operon from the plasmid contained in Escherichia coli FERM BP-4388 or FERM BP-4389, deposited at the National Institute of Bioscience and Human Technology.

3. The method of claim 1, wherein said polyphosphate kinase gene is obtained from DNA fragments containing the polyphosphate kinase structural gene of Klebsiella aerogenes ATCC 9621, which is contained in Escherichia coli FERM BP-4387, deposited at the National Institute of Bioscience and Human Technology.

4. The method of claim 3, wherein said self-replicative DNA fragment comprises (b) the polyphosphate kinase gene of Klebsiella aerogenes ATCC 9621 and at least one of (a) and (c).

5. The method of claim 4, wherein said self-replicative DNA fragment comprises (a).

6. The method of claim 4, wherein said self-replicative DNA fragment comprises (c).

7. The method of claim 4, wherein said self-replicative DNA fragment comprises (a) and (c).

8. The method of claim 1, wherein said self-replicative DNA fragment comprises (b) the polyphosphate kinase gene of Klebsiella aerogenes ATCC 9621 and at least one of (a) and (c).

9. The method of claim 1, wherein said culturing step is conducted in the presence of an activated sludge.

10. The method of claim 1, wherein said self-replicative DNA fragment comprises (a).

11. The method of claim 1, wherein said self-replicative DNA fragment comprises (b).

12. The method of claim 11, wherein (b) is said E. coli polyphosphate kinase gene.

13. The method of claim 11, wherein (b) is said K. aerogenes polyphosphate kinase gene.

14. The method of claim 1, wherein said self-replicative DNA fragment comprises (c).

15. The method of claim 14, wherein (c) is said E. coli acetate kinase gene.

16. The method of claim 14, wherein (c) is said E. coli pyruvate kinase gene.

17. A method of removing organic substances and phosphorus from waste water, comprising:

culturing a microorganism in a medium, said microorganism comprising a host microorganism selected from the group consisting of E. coli, Pseudomonas, Alcaligenes and Klebsiella, transformed with one or more vector plasmids comprising a self-replicative DNA fragment containing at least one member selected from the group consisting of (a) an E. coli PST operon, (b) an E. coli polyphosphate kinase gene or a K. aerogenes polyphosphate kinase gene, and (c) an E. coli acetate kinase gene or an E. coli pyruvate kinase gene, excluding said self-replicative DNA fragment containing (b) alone;

contacting said microorganism with a waste water for a length of time sufficient to remove organic substances and phosphorus from said waste water; and separating said microorganism from said waste water.

18. The method of claim 17, wherein said E. coli PST operon is the PST operon from the plasmid contained in Escherichia coli FERM-BP-4388 or FERM BP-4389, deposited at the National Institute of Bioscience and Human Technology.

19. The method of claim 17, wherein said polyphosphate kinase gene is obtained from DNA fragments containing the polyphosphate kinase gene of Klebsiella aerogenes ATCC 9621, which is contained in Escherichia coli FERM BP-4387, deposited at the National Institute of Bioscience and Human Technology.

20. The method of claim 19, wherein said self-replicative DNA fragment comprises (b) the polyphosphate kinase gene of Klebsiella aerogenes ATCC 9621 and at least one of (a) and (c).

21. The method of claim 19, wherein said contacting step is conducted in the presence of an activated sludge.

* * * * *

SEQUENCE LISTING ( 1 ) GENERAL INFORMATION:

( i i i ) NUMBER OF SEQUENCES: 2

( 2 ) INFORMATION FOR SEQ ID NO:1:

( i ) SEQUENCE CHARACTERISTICS:
        ( A ) LENGTH: 2376 base pairs
        ( B ) TYPE: nucleic acid
        ( C ) STRANDEDNESS: double
        ( D ) TOPOLOGY: linear (i i) MOLECULE TYPE: cDNA (v i) ORIGINAL SOURCE:
    (A) ORGANISM: Klebsiella aerogenes
    (C) INDIVIDUAL ISOLATE: ATCC 9621

(i x) FEATURE:
    (A) NAME/KEY: CDS
    (B) LOCATION: 281..2335

(x i) SEQUENCE DESCRIPTION: SEQ ID NO:1:

```
CTCGAGATGC GCGACGGCGC AGCTGGCTGG ACGGCGTGAA GTTACCCCCG CAGGTTATGC      60

GGCGGAAGAG TAGTTTGTTA CGTCGGGTGG CGCTGCTGCG CTTACCCGAC TTGTTCATTG     120

CATTACCCGA TATTCCCTTC TCCAACCTTC TAAAATCCCC AACAAAAAAA ATAACTGTCA     180

TACTTTTCTG GCACTGTTGG ACATATCGTG GAAATGCTCG CCATAATAAG GACGAGACGG     240

ATTTACCACG TCCTGTGATT GAACTGGAGT GTGAGCTGTA ATG GGT CAG GAA AAG       295
                                             Met Gly Gln Glu Lys
                                              1               5

TTA TAT ATC GAG AAA GAG CTA AGC TGG TTA GCA TTT AAC GAA CGT GTA       343
Leu Tyr Ile Glu Lys Glu Leu Ser Trp Leu Ala Phe Asn Glu Arg Val
             10                  15                  20

CTC CAG GAA GCG GCA GAC AAA AGT AAC CCG CTG ATC GAG CGC ATG CGT       391
Leu Gln Glu Ala Ala Asp Lys Ser Asn Pro Leu Ile Glu Arg Met Arg
         25                  30                  35

TTT TTG GGC ATT TAT TCC AAC AAC CTG GAT GAG TTC TAC AAG GTT CGC       439
Phe Leu Gly Ile Tyr Ser Asn Asn Leu Asp Glu Phe Tyr Lys Val Arg
     40                  45                  50

TTT GCC GAG CTG AAA AGA CGC ATC ATC ATC AGC GAA GAA CAG GGC TTA       487
Phe Ala Glu Leu Lys Arg Arg Ile Ile Ile Ser Glu Glu Gln Gly Leu
 55                  60                  65

AAC TCG CAC TCG CGG CAT CTG CTG GGC AAA ATC CAG TCC CGC GTA CTG       535
Asn Ser His Ser Arg His Leu Leu Gly Lys Ile Gln Ser Arg Val Leu
 70                  75                  80                  85

AAA GCC GAT CAG GAA TTT GAC GGC CTG TAT AAC GAA CTG CTG CTG GAG       583
Lys Ala Asp Gln Glu Phe Asp Gly Leu Tyr Asn Glu Leu Leu Leu Glu
             90                  95                 100

ATG GCG CGC AAT CAA ATC TTC CTG ATT AAC GAA CGC CAG CTT TCC GTT       631
Met Ala Arg Asn Gln Ile Phe Leu Ile Asn Glu Arg Gln Leu Ser Val
                105                 110                 115

AAC CAA CAA AAC TGG CTG CGC CAC TAC TTC AAA CAC TAT CTG CGC CAG       679
Asn Gln Gln Asn Trp Leu Arg His Tyr Phe Lys His Tyr Leu Arg Gln
             120                 125                 130

CAC ATT ACC CCG ATT CTG ATC AAC CGC GAA ACC GAT CTG GTT CAG TTC       727
His Ile Thr Pro Ile Leu Ile Asn Arg Glu Thr Asp Leu Val Gln Phe
 135                 140                 145

CTG AAG GAT GAT TAC ACC TAC CTG GCG GTG GAA ATT ATT CGC GGT GAG       775
Leu Lys Asp Asp Tyr Thr Tyr Leu Ala Val Glu Ile Ile Arg Gly Glu
150                 155                 160                 165

TCT ATC CGT TAC CCG CTG CTG GAG ATC CCG TCC GAC AAG GTG CCG CGC       823
Ser Ile Arg Tyr Pro Leu Leu Glu Ile Pro Ser Asp Lys Val Pro Arg
             170                 175                 180

TTT GTG AAC CTG CCG CCG GAA ACC CCG CGC AGA CGC AAG CCG ATG ATC       871
Phe Val Asn Leu Pro Pro Glu Thr Pro Arg Arg Arg Lys Pro Met Ile
                185                 190                 195

CTG CTG GAT AAC ATC CTG CGC TAC TGT CTG GAC GAC ATC TTC AAA GGC       919
Leu Leu Asp Asn Ile Leu Arg Tyr Cys Leu Asp Asp Ile Phe Lys Gly
             200                 205                 210

TTC TTC GAT TAC GAT GCG TTA AAC GCC TAC TCG ATG AAA ATG ACC CGT       967
Phe Phe Asp Tyr Asp Ala Leu Asn Ala Tyr Ser Met Lys Met Thr Arg
 215                 220                 225
```

-continued

| | | | | | | | | | | | | | | | | |
|---|---|---|---|---|---|---|---|---|---|---|---|---|---|---|---|---|
| GAC | GCC | GAA | TAT | GAC | CTG | GTG | CAC | GAG | ATG | GAA | GCC | AGC | CTG | ATG | GAG | 1015 |
| Asp | Ala | Glu | Tyr | Asp | Leu | Val | His | Glu | Met | Glu | Ala | Ser | Leu | Met | Glu | |
| 230 | | | | 235 | | | | | 240 | | | | | | 245 | |
| CTG | ATG | TCC | TCC | AGC | CTG | AAA | CAG | CCT | GAC | GCC | GAG | CCG | GTG | CGC | TTT | 1063 |
| Leu | Met | Ser | Ser | Ser | Leu | Lys | Gln | Pro | Asp | Ala | Glu | Pro | Val | Arg | Phe | |
| | | | | 250 | | | | | 255 | | | | | 260 | | |
| GTC | TAT | CAG | CGC | GAT | ATG | CCG | GAC | GCC | ATG | GTG | GAG | ATG | CTG | CGC | GAT | 1111 |
| Val | Tyr | Gln | Arg | Asp | Met | Pro | Asp | Ala | Met | Val | Glu | Met | Leu | Arg | Asp | |
| | | | 265 | | | | | 270 | | | | | 275 | | | |
| AAA | CTG | ACC | ATT | TCG | CGC | TAT | GAC | TCC | ATC | GTG | CCG | GGC | GGT | CGT | TAC | 1159 |
| Lys | Leu | Thr | Ile | Ser | Arg | Tyr | Asp | Ser | Ile | Val | Pro | Gly | Gly | Arg | Tyr | |
| | | 280 | | | | 285 | | | | | 290 | | | | | |
| CAC | AAC | TTT | AAA | GAC | TTT | ATT | GGC | TTC | CCG | AAC | GTC | GGC | AAA | GCC | AAT | 1207 |
| His | Asn | Phe | Lys | Asp | Phe | Ile | Gly | Phe | Pro | Asn | Val | Gly | Lys | Ala | Asn | |
| | 295 | | | | 300 | | | | | 305 | | | | | | |
| CTG | GTG | AAC | AAG | CCG | CTG | CCG | CGC | CTG | CGC | CAT | CTG | TGG | TTC | GAT | AAA | 1255 |
| Leu | Val | Asn | Lys | Pro | Leu | Pro | Arg | Leu | Arg | His | Leu | Trp | Phe | Asp | Lys | |
| 310 | | | | | 315 | | | | | 320 | | | | | 325 | |
| TTC | CGC | AAC | GGA | TTC | GAC | GCC | ATT | CGC | GAA | CGC | GAC | GTC | CTG | CTC | TAC | 1303 |
| Phe | Arg | Asn | Gly | Phe | Asp | Ala | Ile | Arg | Glu | Arg | Asp | Val | Leu | Leu | Tyr | |
| | | | | 330 | | | | | 335 | | | | | 340 | | |
| TAT | CCG | TAT | CAC | ACG | TTT | GAG | CAC | GTG | CTC | GAA | CTG | CTG | CGT | CAG | GCC | 1351 |
| Tyr | Pro | Tyr | His | Thr | Phe | Glu | His | Val | Leu | Glu | Leu | Leu | Arg | Gln | Ala | |
| | | | 345 | | | | | 350 | | | | | 355 | | | |
| TCG | TTC | GAT | CCG | AGC | GTG | CTG | GCG | ATC | AAA | ATC | AAC | ATC | TAC | CGC | GTG | 1399 |
| Ser | Phe | Asp | Pro | Ser | Val | Leu | Ala | Ile | Lys | Ile | Asn | Ile | Tyr | Arg | Val | |
| | | 360 | | | | 365 | | | | | 370 | | | | | |
| GCA | AAA | GAT | TCC | CGC | ATC | ATC | GAC | GCA | ATG | ATC | CAC | GCG | GCG | CAC | AAC | 1447 |
| Ala | Lys | Asp | Ser | Arg | Ile | Ile | Asp | Ala | Met | Ile | His | Ala | Ala | His | Asn | |
| | 375 | | | | 380 | | | | | 385 | | | | | | |
| GCC | AAA | AAG | GTC | ACC | GTG | GTG | GTT | GAG | CTG | CAG | GCG | CGC | TTC | GAC | GAA | 1495 |
| Ala | Lys | Lys | Val | Thr | Val | Val | Val | Glu | Leu | Gln | Ala | Arg | Phe | Asp | Glu | |
| 390 | | | | 395 | | | | | 400 | | | | | 405 | | |
| GAG | GCC | AAT | ATT | CAC | TGG | GCG | CGC | CGT | CTG | ACG | GAA | GCC | GGT | GTG | CAC | 1543 |
| Glu | Ala | Asn | Ile | His | Trp | Ala | Arg | Arg | Leu | Thr | Glu | Ala | Gly | Val | His | |
| | | | | 410 | | | | | 415 | | | | | 420 | | |
| GTC | ATC | TTC | TCC | GCG | CCG | GGG | CTG | AAA | ATT | CAC | GCC | AAG | CTG | TTC | CTC | 1591 |
| Val | Ile | Phe | Ser | Ala | Pro | Gly | Leu | Lys | Ile | His | Ala | Lys | Leu | Phe | Leu | |
| | | | 425 | | | | | 430 | | | | | 435 | | | |
| ATC | TCC | CGT | AAA | GAG | GGT | GAC | GAT | GTA | GTG | CGC | TAT | GCC | CAC | ATC | GGT | 1639 |
| Ile | Ser | Arg | Lys | Glu | Gly | Asp | Asp | Val | Val | Arg | Tyr | Ala | His | Ile | Gly | |
| | | 440 | | | | 445 | | | | | 450 | | | | | |
| ACC | GGG | AAC | TTT | AAC | GAG | AAA | ACT | TCT | CTA | ATT | TAT | ACC | GAC | TAC | TCG | 1687 |
| Thr | Gly | Asn | Phe | Asn | Glu | Lys | Thr | Ser | Leu | Ile | Tyr | Thr | Asp | Tyr | Ser | |
| | 455 | | | | 460 | | | | | 465 | | | | | | |
| CTC | TTA | ACC | GCC | GAC | GCC | CGC | ATC | ACT | AAC | GAA | GTG | CGC | CGG | GTC | TTT | 1735 |
| Leu | Leu | Thr | Ala | Asp | Ala | Arg | Ile | Thr | Asn | Glu | Val | Arg | Arg | Val | Phe | |
| 470 | | | | 475 | | | | | 480 | | | | | 485 | | |
| AAC | TTT | ATC | GAA | AAC | CCG | TAC | CGT | CCG | GTG | AGC | TTT | GAC | TAT | CTG | CTG | 1783 |
| Asn | Phe | Ile | Glu | Asn | Pro | Tyr | Arg | Pro | Val | Ser | Phe | Asp | Tyr | Leu | Leu | |
| | | | | 490 | | | | | 495 | | | | | 500 | | |
| GTC | TCG | CCG | CAG | AAC | TCG | CGT | CGC | CTG | CTG | TAC | GAT | ATG | ATC | GAT | AAA | 1831 |
| Val | Ser | Pro | Gln | Asn | Ser | Arg | Arg | Leu | Leu | Tyr | Asp | Met | Ile | Asp | Lys | |
| | | | 505 | | | | | 510 | | | | | 515 | | | |
| GAG | ATC | GCC | AAT | GCC | CAG | AAA | GGG | CTG | TCG | TCC | GGC | ATC | ACG | CTG | AAG | 1879 |
| Glu | Ile | Ala | Asn | Ala | Gln | Lys | Gly | Leu | Ser | Ser | Gly | Ile | Thr | Leu | Lys | |
| | | | 520 | | | | 525 | | | | | 530 | | | | |
| CTC | AAC | AAC | CTG | GTC | GAC | AAA | GGG | CTG | GTG | GAC | AGA | CTG | TAT | GCA | GCG | 1927 |
| Leu | Asn | Asn | Leu | Val | Asp | Lys | Gly | Leu | Val | Asp | Arg | Leu | Tyr | Ala | Ala | |
| | 535 | | | | 540 | | | | | 545 | | | | | | |

```
TCC AGC TCA GGC GTG CCG GTT AAC CTG CTG ATC CGC GGC ATG TGC TCG   1975
Ser Ser Ser Gly Val Pro Val Asn Leu Leu Ile Arg Gly Met Cys Ser
550             555             560             565

CTG ATC CCG GAA CTG GAA GGC ATC AGC GAC AAT ATT CGC GTG ATC AGC   2023
Leu Ile Pro Glu Leu Glu Gly Ile Ser Asp Asn Ile Arg Val Ile Ser
            570             575             580

ATC GTT GAC CGT TAC CTG GAA CAC GAT CGG ATC TAT ATT TTT GAT AAT   2071
Ile Val Asp Arg Tyr Leu Glu His Asp Arg Ile Tyr Ile Phe Asp Asn
                585             590             595

GCG GGT GAT AAA CAG GTC TAT CTC TCT TCG GCA GAC TGG ATG ACG CGC   2119
Ala Gly Asp Lys Gln Val Tyr Leu Ser Ser Ala Asp Trp Met Thr Arg
            600             605             610

AAT ATT GAC TAC CGT ATT GAA GTC GCG GCA CCG CTG CTG GAT CCG CGT   2167
Asn Ile Asp Tyr Arg Ile Glu Val Ala Ala Pro Leu Leu Asp Pro Arg
    615             620             625

CTG AAG CAG CAG ATC CTC GAC ATC ATC GAG ATT CTG TTC AGC GAT ACC   2215
Leu Lys Gln Gln Ile Leu Asp Ile Ile Glu Ile Leu Phe Ser Asp Thr
630             635             640             645

GTG AAA GCA CGC TAT ATC GAC AAA GAA CTC AGT AAC CGC TAT GTA CCG   2263
Val Lys Ala Arg Tyr Ile Asp Lys Glu Leu Ser Asn Arg Tyr Val Pro
            650             655             660

CGC GGC AAC CGC CGC AAA GTG CGG TCG CAA CTG GCG ATT TAC GAC TAT   2311
Arg Gly Asn Arg Arg Lys Val Arg Ser Gln Leu Ala Ile Tyr Asp Tyr
                665             670             675

ATC AAA TCA CTC GAG CAA CCC GAT TAACCTATGC CGATAAATGA TAAGACCCCA   2365
Ile Lys Ser Leu Glu Gln Pro Asp
            680             685

CGCCCGCAGA A                                                      2376
```

(2) INFORMATION FOR SEQ ID NO:2:

(i) SEQUENCE CHARACTERISTICS:
(A) LENGTH: 685 amino acids
(B) TYPE: amino acid
(D) TOPOLOGY: linear (i i) MOLECULE TYPE: protein (x i) SEQUENCE DESCRIPTION: SEQ ID NO:2:

```
Met Gly Gln Glu Lys Leu Tyr Ile Glu Lys Glu Leu Ser Trp Leu Ala
1               5                   10                  15

Phe Asn Glu Arg Val Leu Gln Glu Ala Ala Asp Lys Ser Asn Pro Leu
            20                  25                  30

Ile Glu Arg Met Arg Phe Leu Gly Ile Tyr Ser Asn Asn Leu Asp Glu
                35                  40                  45

Phe Tyr Lys Val Arg Phe Ala Glu Leu Lys Arg Arg Ile Ile Ile Ser
        50                  55                  60

Glu Glu Gln Gly Leu Asn Ser His Ser Arg His Leu Leu Gly Lys Ile
65                  70                  75                  80

Gln Ser Arg Val Leu Lys Ala Asp Gln Glu Phe Asp Gly Leu Tyr Asn
                85                  90                  95

Glu Leu Leu Leu Glu Met Ala Arg Asn Gln Ile Phe Leu Ile Asn Glu
            100                 105                 110

Arg Gln Leu Ser Val Asn Gln Asn Trp Leu Arg His Tyr Phe Lys
                115                 120                 125

His Tyr Leu Arg Gln His Ile Thr Pro Ile Leu Ile Asn Arg Glu Thr
        130                 135                 140

Asp Leu Val Gln Phe Leu Lys Asp Asp Tyr Thr Tyr Leu Ala Val Glu
145                 150                 155                 160
```

| Ile | Ile | Arg | Gly | Glu | Ser | Ile | Arg | Tyr | Pro | Leu | Leu | Glu | Ile | Pro | Ser |
|     |     |     |     | 165 |     |     |     | 170 |     |     |     |     |     | 175 |     |

| Asp | Lys | Val | Pro | Arg | Phe | Val | Asn | Leu | Pro | Pro | Glu | Thr | Pro | Arg | Arg |
|     |     |     | 180 |     |     |     |     | 185 |     |     |     |     | 190 |     |     |

| Arg | Lys | Pro | Met | Ile | Leu | Leu | Asp | Asn | Ile | Leu | Arg | Tyr | Cys | Leu | Asp |
|     |     | 195 |     |     |     |     | 200 |     |     |     |     | 205 |     |     |     |

| Asp | Ile | Phe | Lys | Gly | Phe | Phe | Asp | Tyr | Asp | Ala | Leu | Asn | Ala | Tyr | Ser |
|     | 210 |     |     |     |     | 215 |     |     |     |     | 220 |     |     |     |     |

| Met | Lys | Met | Thr | Arg | Asp | Ala | Glu | Tyr | Asp | Leu | Val | His | Glu | Met | Glu |
| 225 |     |     |     |     | 230 |     |     |     |     | 235 |     |     |     |     | 240 |

| Ala | Ser | Leu | Met | Glu | Leu | Met | Ser | Ser | Leu | Lys | Gln | Pro | Asp | Ala |
|     |     |     |     | 245 |     |     |     | 250 |     |     |     |     | 255 |     |

| Glu | Pro | Val | Arg | Phe | Val | Tyr | Gln | Arg | Asp | Met | Pro | Asp | Ala | Met | Val |
|     |     |     | 260 |     |     |     |     | 265 |     |     |     |     | 270 |     |     |

| Glu | Met | Leu | Arg | Asp | Lys | Leu | Thr | Ile | Ser | Arg | Tyr | Asp | Ser | Ile | Val |
|     |     | 275 |     |     |     |     | 280 |     |     |     |     | 285 |     |     |     |

| Pro | Gly | Gly | Arg | Tyr | His | Asn | Phe | Lys | Asp | Phe | Ile | Gly | Phe | Pro | Asn |
|     | 290 |     |     |     |     | 295 |     |     |     |     | 300 |     |     |     |     |

| Val | Gly | Lys | Ala | Asn | Leu | Val | Asn | Lys | Pro | Leu | Pro | Arg | Leu | Arg | His |
| 305 |     |     |     |     | 310 |     |     |     |     | 315 |     |     |     |     | 320 |

| Leu | Trp | Phe | Asp | Lys | Phe | Arg | Asn | Gly | Phe | Asp | Ala | Ile | Arg | Glu | Arg |
|     |     |     |     | 325 |     |     |     |     | 330 |     |     |     |     | 335 |     |

| Asp | Val | Leu | Leu | Tyr | Tyr | Pro | Tyr | His | Thr | Phe | Glu | His | Val | Leu | Glu |
|     |     |     |     | 340 |     |     |     | 345 |     |     |     |     | 350 |     |     |

| Leu | Leu | Arg | Gln | Ala | Ser | Phe | Asp | Pro | Ser | Val | Leu | Ala | Ile | Lys | Ile |
|     |     | 355 |     |     |     |     | 360 |     |     |     |     | 365 |     |     |     |

| Asn | Ile | Tyr | Arg | Val | Ala | Lys | Asp | Ser | Arg | Ile | Ile | Asp | Ala | Met | Ile |
|     | 370 |     |     |     |     | 375 |     |     |     |     | 380 |     |     |     |     |

| His | Ala | Ala | His | Asn | Ala | Lys | Lys | Val | Thr | Val | Val | Val | Glu | Leu | Gln |
| 385 |     |     |     |     | 390 |     |     |     |     | 395 |     |     |     |     | 400 |

| Ala | Arg | Phe | Asp | Glu | Glu | Ala | Asn | Ile | His | Trp | Ala | Arg | Arg | Leu | Thr |
|     |     |     |     | 405 |     |     |     |     | 410 |     |     |     |     | 415 |     |

| Glu | Ala | Gly | Val | His | Val | Ile | Phe | Ser | Ala | Pro | Gly | Leu | Lys | Ile | His |
|     |     |     | 420 |     |     |     |     | 425 |     |     |     |     | 430 |     |     |

| Ala | Lys | Leu | Phe | Leu | Ile | Ser | Arg | Lys | Glu | Gly | Asp | Asp | Val | Val | Arg |
|     |     | 435 |     |     |     |     | 440 |     |     |     |     | 445 |     |     |     |

| Tyr | Ala | His | Ile | Gly | Thr | Gly | Asn | Phe | Asn | Glu | Lys | Thr | Ser | Leu | Ile |
| 450 |     |     |     |     |     | 455 |     |     |     |     | 460 |     |     |     |     |

| Tyr | Thr | Asp | Tyr | Ser | Leu | Leu | Thr | Ala | Asp | Ala | Arg | Ile | Thr | Asn | Glu |
| 465 |     |     |     |     | 470 |     |     |     |     | 475 |     |     |     |     | 480 |

| Val | Arg | Arg | Val | Phe | Asn | Phe | Ile | Glu | Asn | Pro | Tyr | Arg | Pro | Val | Ser |
|     |     |     |     | 485 |     |     |     |     | 490 |     |     |     |     | 495 |     |

| Phe | Asp | Tyr | Leu | Leu | Val | Ser | Pro | Gln | Asn | Ser | Arg | Arg | Leu | Leu | Tyr |
|     |     |     | 500 |     |     |     |     | 505 |     |     |     |     | 510 |     |     |

| Asp | Met | Ile | Asp | Lys | Glu | Ile | Ala | Asn | Ala | Gln | Lys | Gly | Leu | Ser | Ser |
|     |     | 515 |     |     |     |     | 520 |     |     |     |     | 525 |     |     |     |

| Gly | Ile | Thr | Leu | Lys | Leu | Asn | Asn | Leu | Val | Asp | Lys | Gly | Leu | Val | Asp |
|     | 530 |     |     |     |     | 535 |     |     |     |     | 540 |     |     |     |     |

| Arg | Leu | Tyr | Ala | Ala | Ser | Ser | Ser | Gly | Val | Pro | Val | Asn | Leu | Leu | Ile |
| 545 |     |     |     |     | 550 |     |     |     |     | 555 |     |     |     |     | 560 |

| Arg | Gly | Met | Cys | Ser | Leu | Ile | Pro | Glu | Leu | Glu | Gly | Ile | Ser | Asp | Asn |
|     |     |     |     | 565 |     |     |     |     | 570 |     |     |     |     | 575 |     |

| Ile | Arg | Val | Ile | Ser | Ile | Val | Asp | Arg | Tyr | Leu | Glu | His | Asp | Arg | Ile |
|     |     |     | 580 |     |     |     |     | 585 |     |     |     |     | 590 |     |     |

| | | | | | | | | | | | | | | |
|---|---|---|---|---|---|---|---|---|---|---|---|---|---|---|
| Tyr | Ile | Phe 595 | Asp | Asn | Ala | Gly | Asp 600 | Lys | Gln | Val | Tyr | Leu 605 | Ser | Ser | Ala |
| Asp | Trp 610 | Met | Thr | Arg | Asn | Ile 615 | Asp | Tyr | Arg | Ile | Glu 620 | Val | Ala | Ala | Pro |
| Leu 625 | Leu | Asp | Pro | Arg | Leu 630 | Lys | Gln | Gln | Ile | Leu 635 | Asp | Ile | Ile | Glu | Ile 640 |
| Leu | Phe | Ser | Asp | Thr 645 | Val | Lys | Ala | Arg | Tyr 650 | Ile | Asp | Lys | Glu | Leu 655 | Ser |
| Asn | Arg | Tyr | Val 660 | Pro | Arg | Gly | Asn | Arg 665 | Arg | Lys | Val | Arg | Ser 670 | Gln | Leu |
| Ala | Ile | Tyr 675 | Asp | Tyr | Ile | Lys | Ser 680 | Leu | Glu | Gln | Pro | Asp 685 | | | |